United States Patent
He et al.

(10) Patent No.: US 12,130,676 B2
(45) Date of Patent: Oct. 29, 2024

(54) METHOD OF FAN CONTROL IN AN INFORMATION HANDLING SYSTEM USING A PSEUDO TEMPERATURE SENSOR

(71) Applicant: Dell Products L.P., Round Rock, TX (US)

(72) Inventors: Qinghong He, Austin, TX (US); Adolfo S. Montero, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 372 days.

(21) Appl. No.: 17/660,895

(22) Filed: Apr. 27, 2022

(65) Prior Publication Data

US 2023/0350471 A1 Nov. 2, 2023

(51) Int. Cl.
*G05B 19/4155* (2006.01)
*G06F 1/20* (2006.01)

(52) U.S. Cl.
CPC ........... *G06F 1/20* (2013.01); *G05B 19/4155* (2013.01); *G06F 1/206* (2013.01); *G05B 2219/49216* (2013.01)

(58) Field of Classification Search
CPC ....... G06F 1/20; G06F 1/206; G05B 19/4155; G05B 2219/49216
See application file for complete search history.

(56) References Cited

U.S. PATENT DOCUMENTS

2007/0089446 A1* 4/2007 Larson ............... G05D 23/1931
257/E23.08
2018/0082224 A1* 3/2018 Leslie ..................... G06F 9/50

* cited by examiner

*Primary Examiner* — Michael W Choi
(74) *Attorney, Agent, or Firm* — McDermott Will & Emery LLP

(57) ABSTRACT

A method for controlling operation of a fan in an information handling system using a single parameter includes measuring a temperature associated with the information handling system, determining an average power load of the information handling system, determining a ratio based on the average power load, a light power load and a heavy power load, calculating a single parameter based on the measured temperature and the ratio, determining an operating fan speed based on the single parameter and signaling a fan to operate at the operating fan speed. The ratio may be difference between the average power load and the light power load divided by a difference between a heavy power load minus the light power load. Determining an operating fan speed may include applying one or more constants to the ratio.

20 Claims, 3 Drawing Sheets

METHOD OF FAN CONTROL IN AN INFORMATION HANDLING SYSTEM USING A PSEUDO TEMPERATURE SENSOR

BACKGROUND

Field of the Disclosure

The disclosure relates generally to information handling systems, and in particular to a method of controlling fan operation in an information handling system based on a single parameter such as a pseudo sensor temperature.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Embodiments may be generally directed to a method for controlling fan speed in an information handling system. The method comprises measuring a temperature associated with the information handling system, determining an average power load of the information handling system, determining a ratio based on the average power load, a light power load and a heavy power load, calculating a single parameter based on the measured temperature and the ratio, determining an operating fan speed based on the single parameter, and signaling a fan to operate at the operating fan speed.

In some embodiments, the ratio comprises a difference between the average power load and the light power load divided by a difference between a heavy power load minus the light power load. In some embodiments, calculating the single parameter comprises multiplying the ratio by a first constant. In some embodiments, determining the single parameter further comprises applying a second constant.

In some embodiments, the method further comprises determining the information handling system is operating in a reduced capacity mode and setting the first constant to zero, wherein the operating fan speed is determined based on the measured temperature.

In some embodiments, a light power load comprises 60% of the heavy power load or 10% CPU and/or GPU utilization.

In some embodiments, measuring the temperature associated with the information handling system comprises measuring a skin temperature of a cover of the information handling system.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

This document describes a method for maintaining a threshold operating temperature in an information handling system that includes:

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-6 wherein like numbers are used to indicate like and corresponding parts.

Figure 1:
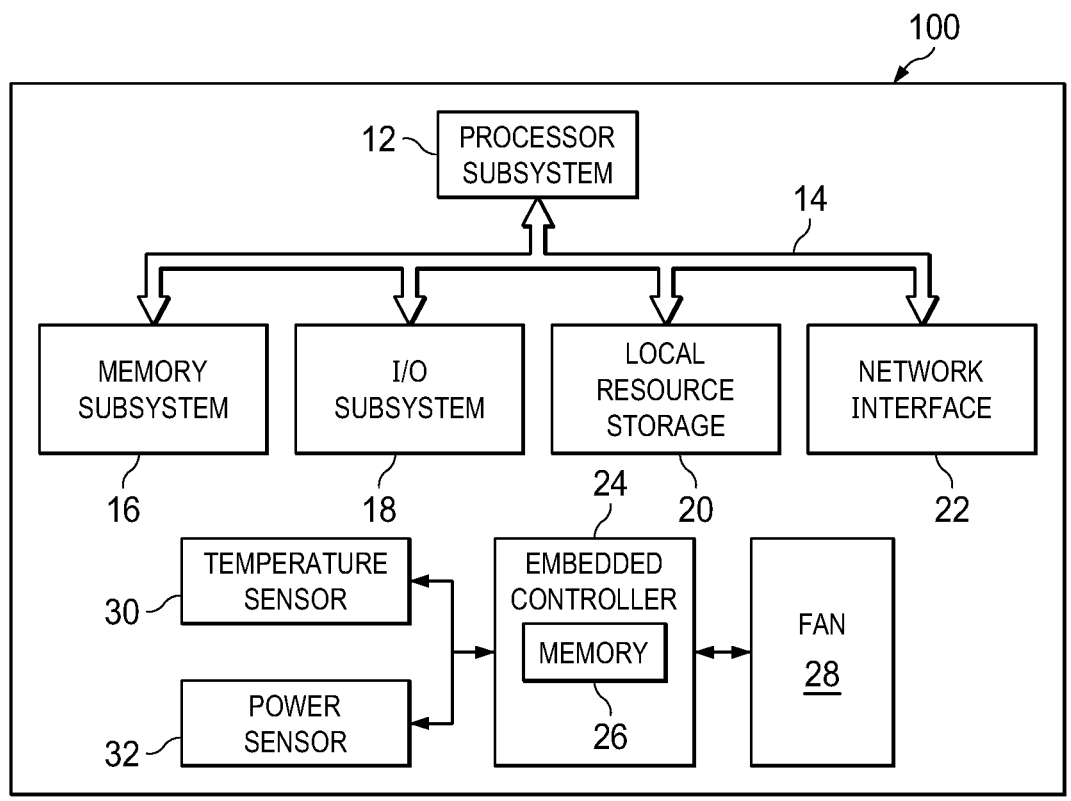
FIG. 1 is a block diagram of selected elements of an information handling system with one embodiment of a cooling system.

Turning now to the drawings, FIG. 1 is a block diagram of selected elements of an embodiment of a computing environment that includes an information handling system. Specifically, FIG. 1 illustrates a block diagram depicting selected elements of an information handling system 100 in accordance with some embodiments of the present disclosure. In other embodiments, information handling system 100 may represent different types of portable information handling systems, such as, display devices, head mounted displays, head mount display systems, smart phones, tablet computers, notebook computers, media players, foldable display systems, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems.

In the embodiment illustrated in FIG. 1, components of information handling system 100 may include, but are not limited to, a processor subsystem 12, which may comprise one or more processors, and system bus 14 that communicatively couples various system components to processor subsystem 12 including, for example, a memory subsystem 16, an I/O subsystem 18, a local storage resource 20, and a network interface 22. Components in information handling system 100 may include embedded controller (EC) 24 with memory 26 storing instructions and values for operating fan 28 and may further include temperature sensor 30 and power sensor 32 for determining an operating speed of fan 28, discussed in more detail below.

In information handling system 100, processor subsystem 12 may comprise a system, device, or apparatus operable to interpret and/or execute program instructions and/or process data, and may include a central processing unit (CPU), microprocessor, microcontroller, digital signal processor (DSP), application specific integrated circuit (ASIC), or another digital or analog circuitry configured to interpret and/or execute program instructions and/or process data. In some embodiments, processor subsystem 12 may interpret and/or execute program instructions and/or process data stored locally (e.g., in memory subsystem 16 and/or another component of information handling system 100). In the same or alternative embodiments, processor subsystem 12 may interpret and/or execute program instructions and/or process data stored remotely. In one embodiment, processor subsystem 12 may be or include a multi-core processor comprised of one or more processing cores disposed upon an IC chip. In other embodiments, processor subsystem 12 may be or include an integrated device (e.g., microcontroller, system on a chip (SoC), and the like) that includes dedicated memory, peripheral interfaces, and/or other components suitable for interpreting and/or executing program instructions and/or processing data.

System bus 14 may represent a variety of suitable types of bus structures (e.g., a memory bus, a peripheral bus, or a local bus) using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express (PCIe) bus, HyperTransport (HT) bus, and Video Electronics Standards Association (VESA) local bus.

In one embodiment, memory subsystem 16 may comprise a system, device, or apparatus operable to retain and/or retrieve program instructions and/or data for a period of time (e.g., computer-readable media). Memory subsystem 16 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In one embodiment, I/O subsystem 18 may comprise a system, device, or apparatus generally operable to receive and/or transmit data to, from, and/or within information handling system 100. I/O subsystem 18 may represent, for example, a variety of communication interfaces, graphics interfaces, video interfaces, user input interfaces, and/or peripheral interfaces. In various embodiments, I/O subsystem 18 may be used to support various peripheral devices, such as a touch panel, a display adapter, a keyboard, an accelerometer, a touch pad, a gyroscope, an IR sensor, a microphone, a sensor, a camera, or another type of peripheral device.

In one embodiment, local storage resource 20 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data.

In one embodiment, network interface 22 may be a suitable system, apparatus, or device operable to serve as an interface between information handling system 100 and a network. Network interface 22 may enable information handling system 100 to communicate over a network using a suitable transmission protocol and/or standard, including, but not limited to, transmission protocols and/or standards such as Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. A network may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), a Cloud network, an Edge network, an intranet, the Internet or another appropriate architecture or system that facilitates the communication of signals, data and/or messages (generally referred to as data). Network interface 22 may enable wired and/or wireless communications (e.g., NFC or Bluetooth) to and/or from information handling system 100.

Cooling System Overview

Embodiments include a cooling system comprising EC 24 with memory 26 storing instructions and values for operating fan 28 and may further include temperature sensor 30 and power sensor 32 for determining an operating speed of fan 28 using a single parameter (Tpseudo) that considers the operating temperature and the power load of information handling system.

In one embodiment, EC 24 may comprise a system, device, or apparatus operable to support various system tasks on behalf of information handling system 100. In particular, EC 24 may be or include an electronic hardware device (e.g. a microcontroller) operable to communicate with temperature sensor 30 and power sensor 32 to receive signals or values indicating temperature and power load, respectively. EC 24 then uses a single parameter that is based on an operating temperature and power load of information handling system 100 to control fan speed of fan 28. In one embodiment, EC 24 may execute firmware instructions (e.g., stored in memory 26) that allows EC 24 to communicate with temperature sensor 30 and power usage sensor 32 to monitor information handling system 100.

Memory 26 stores fan speed values corresponding to values of a single parameter (e.g., Tpseudo) for cooling information handling system 100. A fan speed value may also correspond to a noise level. For example, for a Tpseudo value of 42, a fan speed value of 2000 RPM may correspond to a noise level of 0.4 Sones, for a Tpseudo value of 44, a fan speed value of 2700 RPM may correspond to a noise level of 0.7 Sones, for a Tpseudo value of 46, a fan speed value of 3500 RPM may correspond to a noise level of 1.4 Sones and for a Tpseudo value of 47, a fan speed value of 5200 RPM may correspond to a noise level of 3.5 Sones.

In one embodiment, fan 28 comprises a system, device, or apparatus operable to generate airflow within information handling system 100. Fan 28 may be or include a hardware device operable to direct a surrounding airflow across one or more devices (e.g., processor subsystem 12, memory subsystem 16, EC 24, and the like) to cause ambient heat within information handling system 100 to circulate through information handling system 100 and exit information handling system 100. In one embodiment, fan 28 may be or include a centrifugal fan that includes a ducted housing to direct outgoing air across one or more devices of information handling system 100. In other embodiments, fan 28 may be or include a positive displacement blower, a helical screw blower, a high-speed blower, a regenerative blower, and/or any other type of blower suitable for directing a surrounding air flow across one or more devices of information handling system 100.

Operating Temperature

In one embodiment, temperature sensor 30 is operable to sense, or otherwise detect, an operating temperature associated with information handling system 100. Specifically, temperature sensor 30 may be or include a thermal sensing device operable to detect an operating temperature associated with information handling system 100 during operation. In one embodiment, temperature sensor 30 may be or include a resistance temperature detector (RTD). In other embodiments, temperature sensor 30 may be or include a negative temperature coefficient (NTC) thermistor, a thermocouple sensor, a semiconductor-based sensor, and/or any other type of sensor suitable for sensing, or otherwise detecting, an operating temperature associated with information handling system 100. Temperature sensor 30 may sense, or otherwise detect, a surface temperature, or "skin temperature," associated with one or more covers that form a housing of information handling system 100. In some embodiments, an operating temperature of information handling system 100 may be sensed, or otherwise detected, directly and/or indirectly by temperature sensor 30 based on the skin temperature.

Power Loads

In one embodiment, power sensor 32 may comprise a system, device, or apparatus operable to determine power usage, or a "power load," associated with information handling system 100. In particular, power sensor 32 may be or include a hardware device (e.g., an integrated circuit (IC)) disposed on a motherboard (not shown in figure) of information handling system 100 operable to detect, manage, and/or report a power load associated with information handling system 100 during operation. In one embodiment, power sensor 32 may be communicably coupled to one or more devices disposed throughout information handling system 100 such that power used by information handling system 100 may be determined and a corresponding operating temperature may be calculated. For example, power sensor 32 may be communicably coupled to processor subsystem 12, one or more graphics processing units (GPU) of information handling system 100 (not shown), and memory subsystem 16 such that the power used by information handling system 100 may be collectively sensed to determine a power load associated with information handling system 100.

In one embodiment, power loads may be classified, or otherwise categorized, in terms of respective power loads associated with information handling system 100. Power sensor 32 may detect, manage, and/or report a heavy power load associated with high CPU and/or GPU usage. A heavy load may refer to a significant, or "maximum," power load with high CPU and/or GPU utilization. In some embodiments, a heavy load may refer to 90% CPU/GPU utilization. In some embodiments, a heavy power load may correspond to the maximum amount of power that information handling system 100 can receive to process information and fan 28 is able to cool. For example, CPU/GPU utilization in information handling system 100 may consume approximately 15 Watts (W) of power while information handling system 100 executes a computer-aided design (CAD) application. Similarly, power sensor 32 may detect, manage, and/or report a light power load associated with low CPU and/or GPU power usage. A light workload may refer to a typical power load with low CPU and/or GPU utilization. In some embodiments, a light load may refer to 10% CPU/GPU utilization. Examples of power loads at or below a light power load include word processing and Internet browsing. In some embodiments, a light power load may correspond to an amount of power that information handling system 100 can receive to process information and fan 28 is able to cool while keeping fan noise below a threshold sound level. In the examples above, a light power load may comprise approximately 60% of a heavy power load (e.g., 10 W based on a 15 W heavy load). In some embodiments, a processor (including a CPU or GPU) in processor subsystem 12 may directly communicate its power usage information to an embedded controller (EC).

In one embodiment, a power load associated with information handling system 100 may correspond to a fan speed associated with fan 28. That is, each power load may correspond to a fan speed required to maintain an optimal operating temperature, and/or acoustic performance, of information handling system 100. In some embodiments, a light power load may be associated with information handling system 100 operating at less than 10% CPU/GPU utilization such that information handling system 100 may process information at any power load below the light power load and fan 28 may operate at an operating fan speed to cool a cover of information handling system without fan noise above 1.4 Sones. A heavy power load may be associated with information handling system 100 receiving a maximum amount of power (e.g., 90% CPU and/or GPU utilization) and fan 28 is able to maintain an operating temperature of information handling system 100 below a maximum operating temperature. In In some embodiments, at the heavy power load, fan 28 may generate fan noise of 3.5 Sones.

FAN NOISE

Conventionally, on-board fan assemblies (e.g., fan 28) can generate fan noise that may be distracting to a user. Users expect fan 28 to operate at higher fan speeds under heavy power loads (e.g., gaming) and tolerate the associated higher fan noise. However, if information handling system 100 is operating at a light power load (e.g., Internet browsing, word processing), users want a quieter experience and expect fan 28 to operate at a lower noise level. In other words, users expect a much quieter fan noise (e.g., 1.4 Sones) and may be willing for a cover of information handling system 100 to have a higher skin temperature (e.g., 46° C.) under light power loads.

Fan Operation Based on Temperature or Power Load Only

Figure 2:
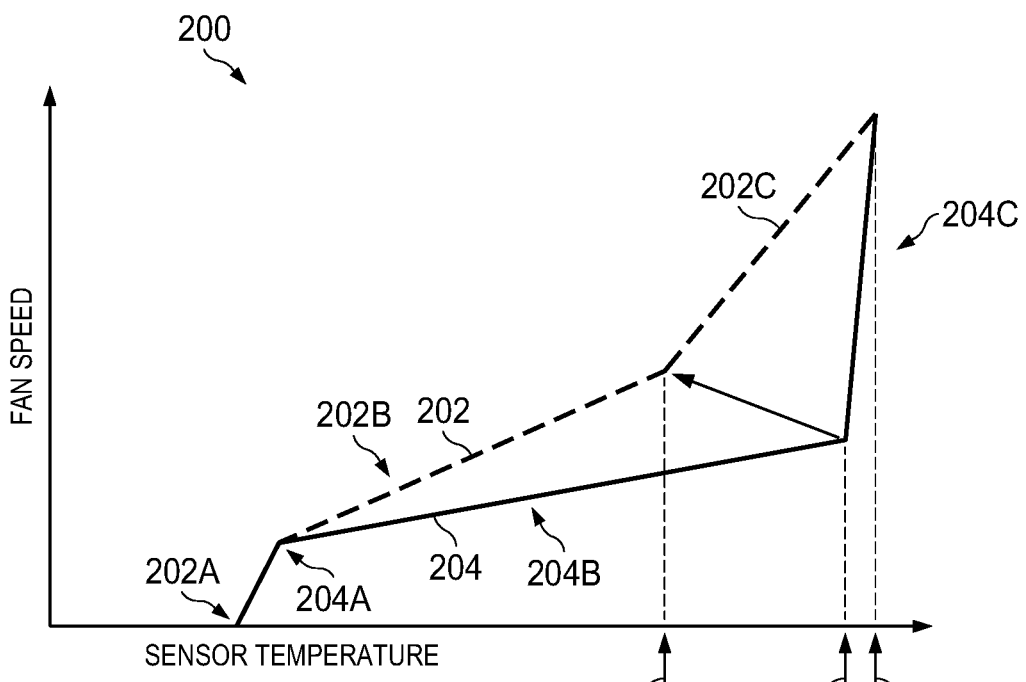
FIG. 2 is a graph depicting fan speeds for sensor temperatures, illustrating the difficulty in determining a fan speed to address a power load and a skin temperature while minimizing fan noise.

Referring to FIG. 2, graph 200 depicts fan speeds for sensor temperatures. Line 202 corresponds to fan speeds based on operating temperatures, wherein each operating temperature associated with information handling system 100 may correspond to a fan speed value associated with fan 28. That is, each fan speed is based on fan 28 operating to maintain an operating temperature and/or acoustic performance of information handling system 100 independent of the power load. As depicted in FIG. 2, fan control based only on sensor temperature may not support acoustic requirements. In particular, if information handling system is operating at a light power load (corresponding to sensor temperature 206-2), operating fan 28 based on sensor temperature 206-2 will result in fan 28 operating at a higher fan speed, resulting in more fan noise that may exceed an acoustic requirement (e.g., fan noise less than 1.4 Sones). As mentioned above, users are willing to allow information handling system 100 to operate at a higher temperature in order to have a quieter experience.

One approach to having a quieter user experience is to allow information handling system 100 to operate at a higher temperature to allow fan 28 to operate at a lower noise level for longer before increasing the fan speed. Referring to FIG. 2, line 204 represents fan speeds corresponding to power loads. Sensor temperature 206-1 corresponds to an operating temperature associated with a light power load and is close to sensor temperature 208 associated with a heavy power load to delay fan 28 from operating at a higher fan speed. An issue with this approach is that if fan 28 operates based on power load such that sensor temperature 206-1 gets too close to sensor temperature 208 (e.g., 1° C.) and temperature sensor 30 is accurate to ±1° C., fan 28 may be constantly ramping up and down for 1° C. deviations in temperature, which may be annoying to a user.

Alternatively, artificially lowering sensor temperature 206 (i.e., operating fan 28 at higher speeds once a sensor temperature 206 is closer to sensor temperature 206-2 than sensor 206-1) results in increased fan noise under light power loads. Referring to FIG. 2, line 202 represents fan speeds corresponding to operating temperatures of information handling system 100, wherein sensor temperature 206-1 corresponds to a lower operating temperature (e.g., a skin temperature of 42° C.). Operating fan 28 based on a lower sensor temperature (e.g., sensor temperature 206-1) prevents fan 28 from constantly ramping up and down but results in fan 28 operating at generally higher fan speeds that may be annoying to a user. Operating fan 28 based on either case may result in an unpleasant experience for a user.

Fan Operation Based on Tpseudo as a Single Parameter

In some embodiments, controlling fan 28 relies on EC 24 measuring an operating temperature of information handling system 100, determining a power load associated with information handling system 100 and causing fan 28 to rotate based on a single parameter that considers both the measured temperature and the power load.

Figure 3:
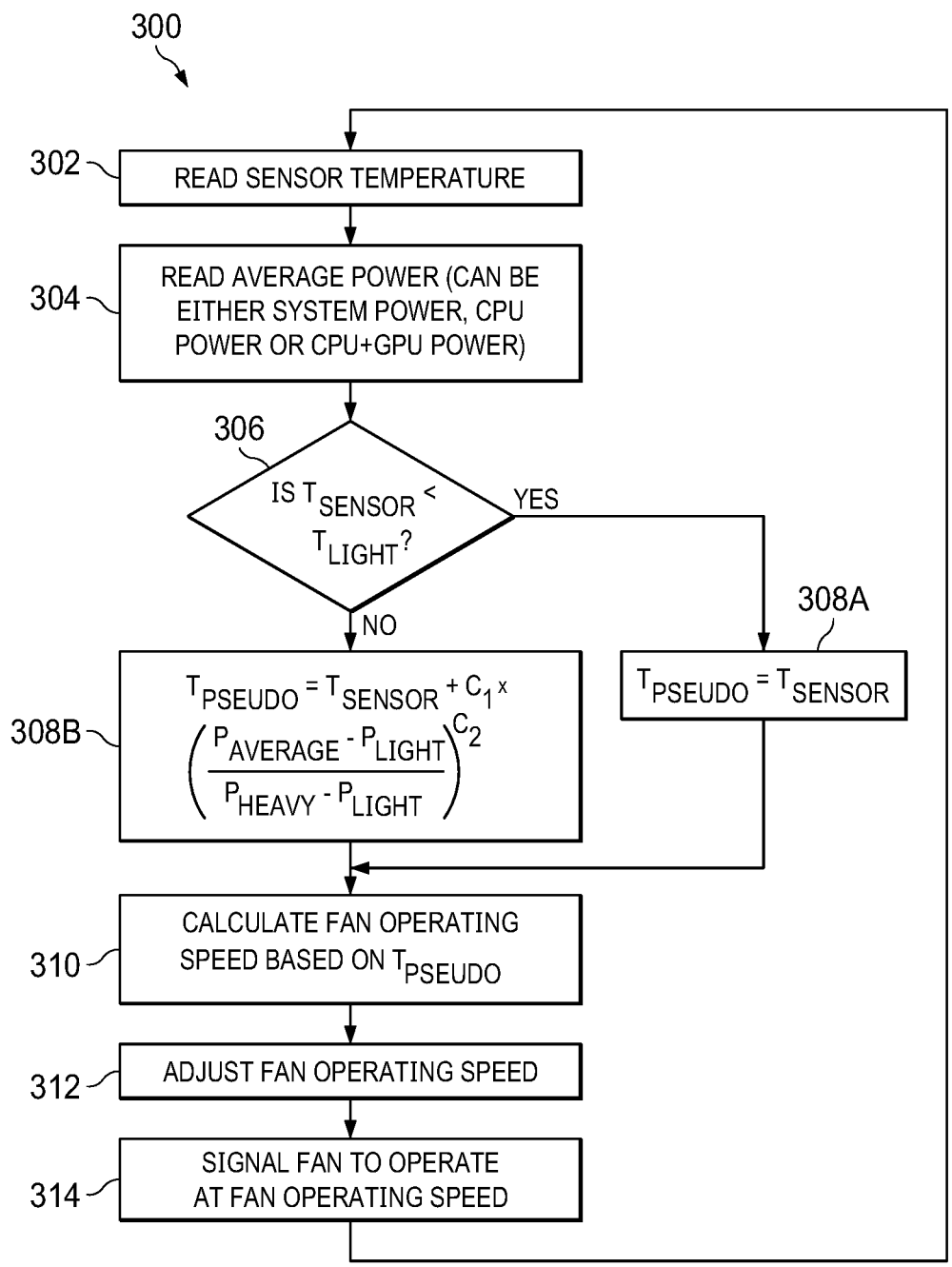
FIG. 3 depicts a flow diagram of a method for controlling fan speed based on a single parameter that accounts for sensor temperature and power load.

FIG. 3 depicts a flow diagram 300 illustrating a method for controlling fan operation based on a single parameter.

At step 302, embodiments read a sensor temperature (e.g., $T_{sensor}$). The sensor temperature may be a skin temperature of information handling system 100.

At step 304, embodiments read average power load (e.g., $P_{average}$). The average power load may be total system power, CPU power or CPU and GPU power, for example.

At step 306, embodiments determine if the sensor temperature (e.g., $T_{sensor}$) is less than a temperature associated with information handling system 100 operating at a light power load ($P_{light}$).

If the sensor temperature (e.g., $T_{sensor}$) is less than or equal to a temperature associated with information handling system 100 operating at a light power load ($P_{light}$), then at step 308A, a parameter ($T_{pseudo}$) is set equal to the sensor temperature.

If the sensor temperature (e.g., $T_{sensor}$) is greater than a temperature associated with information handling system 100 operating at a light power load ($P_{light}$), then at step 308B, a parameter ($T_{pseudo}$) is calculated based on the sensor temperature and a ratio of the difference between the average power load (e.g., $P_{average}$) minus the light power load (e.g., $P_{light}$) divided by the difference between a heavy power load (e.g., $P_{heavy}$) minus the light power load (e.g., $P_{light}$).

At step 310, embodiments may calculate a fan speed based on the single parameter ($T_{pseudo}$).

At step 312, embodiments may adjust the fan operating speed using one or more constants to apply to the ratio, discussed in greater detail below.

At step 310, embodiments signal fan 28 to operate at the fan speed based on the single parameter ($T_{pseudo}$).

Steps 302-314 may be repeated as necessary to ensure information handling system 100 is cooled and fan noise is minimized.

Fan Operation for Power Loads Less than a Light Power Load

In some embodiments, controlling fan 28 relies on EC 24 measuring an operating temperature (e.g., $T_{sensor}$) of information handling system 100, determining a power load (e.g., $P_{average}$) associated with information handling system 100, determining the measured power load (e.g., $P_{average}$) is less than or equal to a light power load (e.g., $P_{light}$) and causing fan 28 to rotate based on the measured temperature. As such, if the measured temperature (e.g., 42° C.) is less than a maximum temperature (e.g., a skin temperature of 47° C.) and information handling system 100 is operating at a first power load less than or equal to a light power load, EC 24 may cause fan 28 to operate at a fan speed based on the measured temperature.

Fan Operation for Power Loads Greater than a Light Power Load

In some embodiments, controlling fan 28 relies on EC 24 measuring an operating temperature (e.g., $T_{sensor}$) of information handling system 100, determining a power load (e.g., $P_{average}$) associated with information handling system 100, determining the average measured power load (e.g., $P_{average}$) is greater than a light power load (e.g., $P_{light}$), determining a ratio based on the average measured power load (e.g., $P_{average}$), the light power load (e.g., $P_{light}$) and a heavy power load (e.g., $P_{heavy}$) and causing fan 28 to rotate in accordance with a single parameter (e.g., $T_{pseudo}$) based on a combination of the measured temperature and the ratio. For example, EC 24 may control the fan speed of fan 28 using a single parameter (e.g., $T_{pseudo}$) according to the following equation:

$$T_{pseudo} = T_{sensor} + C_1 \times \left(\frac{P_{average} - P_{light}}{P_{heavy} - P_{light}}\right)^{C_2},$$

wherein $T_{sensor}$ is the measured temperature, $P_{average}$ is the average measured power load, $P_{light}$ is the power load associated with information handling system 100 operating at a light power load (e.g., 10% CPU and/or GPU utilization, 60% of a heavy power load, 65% of a maximum power load, etc.) and $P_{heavy}$ is the power load associated with information handling system 100 operating at a heavy power load (e.g., 15 W, 90% of a maximum load, etc.). Constants $C_1$ and $C_2$ may be used to modify fan speeds, discussed in greater detail with respect to FIGS. 5 and 6.

Figure 4:
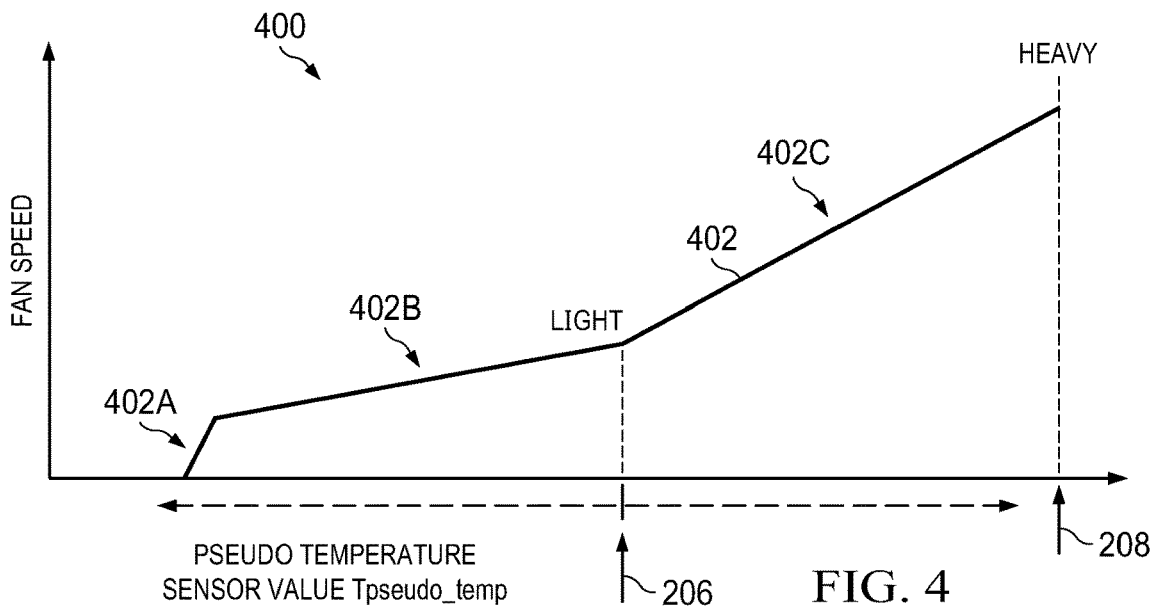
FIGS. 4-6 are graphs depicting fan speeds for sensor temperatures, illustrating a method for controlling fan speed based on a single parameter that accounts for sensor temperature and power load.

Referring to FIG. 4, graph 400 depicts fan speeds for values of a single parameter (e.g., $T_{pseudo}$) that considers an operating temperature and a power load of information handling system 100. Segments 402A and 402B depict fan speeds for the single parameter, wherein the single parameter (e.g., $T_{pseudo}$) corresponds to a measured temperature (e.g., $T_{sensor}$) of information handling system 100 being less than or equal to an operating temperature (e.g., $T_{sensor}$) corresponding to information handling system 100 operating at power loads less than or equal to a light power load 406. Segment 402C depicts fan speeds for the single parameter (e.g., $T_{pseudo}$) that correspond to information handling system 100 operating at a measured temperature that is greater than an operating temperature corresponding to a light power load and at a power load greater than light power load 206 and less than heavy power load 208. As depicted in FIG. 4, if the measured temperature (e.g., $T_{sensor}$) is less than sensor temperature 206 corresponding to a light power load and information handling system 100 is operating at an average power load (e.g., $P_{average}$) less than or equal to a light power load (e.g., less than or equal to $P_{light}$), EC 24 may cause fan 28 to operate at a fan speed based on the measured temperature. If the measured temperature is greater than sensor temperature 206 corresponding to a light power load and information handling system 100 is operating at an average power load greater than a light power load (e.g., greater than 10 Watts), EC 24 may cause fan 28 to operate at a fan speed based on the measured temperature and the ratio of the difference between the average power load (e.g., $P_{average}$) minus the light power load (e.g., $P_{light}$) divided by the difference between the heavy power load (e.g., $P_{heavy}$) minus the light power load (e.g., $P_{light}$).

Figure 5:
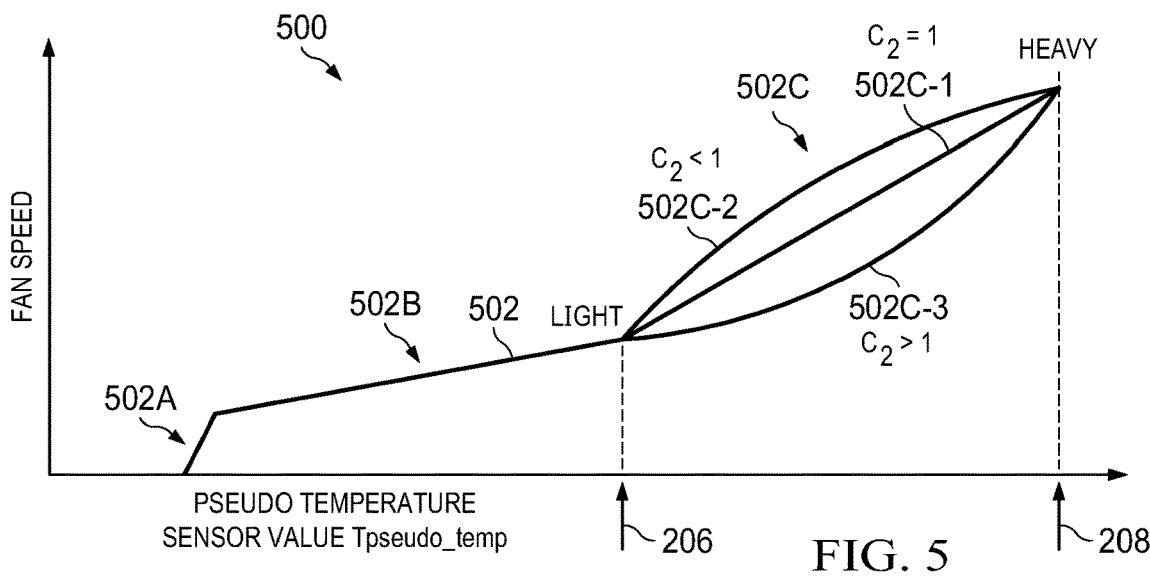

Referring to FIG. 5 as a graphical representation 500 of the equation mentioned above, line 502 represents fan speeds for a single parameter ($T_{pseudo}$) that considers the measured temperature and the power load of information handling system 100. A first constant (e.g., $C_1$) may modify the slope of line 502 between $T_{pseudo}$ 206 corresponding to a light power load and $T_{pseudo}$ 208 corresponding to a heavy power load. Segments 502A and 502B depict fan speeds corresponding to measured temperature (e.g., $T_{sensor}$) being less than sensor temperature 206 corresponding to a light power load and information handling system 100 operating at a power load less than or equal to a light power load. Segment 502C depicts fan speeds corresponding to the measured temperature (e.g., $T_{sensor}$) being greater than sensor temperature 206 associated with light power load and information handling system 100 operating at a power load greater than a light power load and less than a heavy power load. If the measured temperature is less than sensor temperature 206 associated with a light power load (e.g., $P_{light}$ is 10 Watts) and information handling system 100 is operating at a power load less than or equal to a light power load (e.g., $P_{average}$ is less than or equal to 10 Watts or 10% CPU/GPU utilization), EC 24 may cause fan 28 to operate at a fan speed based on the measured temperature. If the measured temperature is greater than sensor temperature 206 corresponding to the light power load and information handling system 100 is operating at a power load greater than the light power load (e.g., $P_{average}$ is greater than 10 Watts), EC 24 may cause fan 28 to operate at a fan speed based on the measured temperature and the ratio of the difference between the average power load (e.g., $P_{average}$) minus the light power load (e.g., $P_{light}$) divided by the difference between the heavy power load (e.g., $P_{heavy}$) minus the light power load (e.g., $P_{light}$).

A second constant ($C_2$) may be applied to the ratio of the difference between the average power load (e.g., $P_{average}$) minus the light power load (e.g., $P_{light}$) divided by the difference between the heavy power load (e.g., $P_{heavy}$) minus the light power load (e.g., $P_{light}$) to accommodate variations in information handling system 100 and user preferences. Applying $C_2$ to the ratio may be referred to as exponentiation or "raising the ratio to the power of $C_2$". For example, segments 502C-1, 502C-2 and 502C-3 depict relationships between fan speed and $T_{pseudo}$, wherein segment 502C-1 depicts a linear relationship between fan speed and $T_{pseudo}$ corresponding to constant $C_2$ being equal to one, segment 502C-2 represents a non-linear relationship between fan speed and $T_{pseudo}$ corresponding to $C_2$ being greater than one and segment 502C-3 represents a non-linear relationship between fan speed and $T_{pseudo}$ corresponding to $C_2$ being less than one. Constants $C_1$ and $C_2$ may be selected by a user or may be selected based on one or more criteria or operating parameters of information handling system 100. For example, one or more of constants $C_1$ and $C_2$ may be selected to be less than one if a GPU is operating at an overclocked speed, may be selected to be greater than one if processor subsystem 12 is writing to memory subsystem 16, etc.

Figure 6:
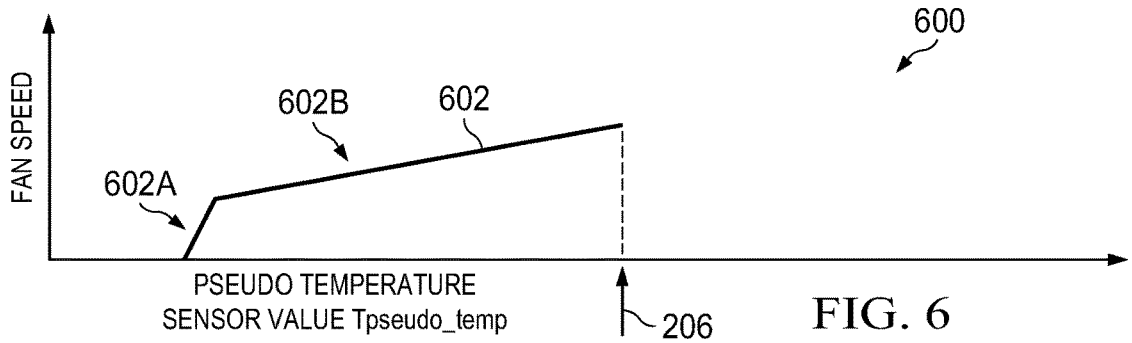

Referring to FIG. 6, graph 600 represents fan speeds for $T_{pseudo}$ values, wherein if constant ($C_1$) equals zero, embodiments may control fan speed based on temperature only. Segments 602A and 602B of line 602 correspond to information handling system 100 operating at a measured temperature being less than or equal to sensor temperature 206 associated with a light power load and information handling system 100 operating at an average power load less than or equal to a light power load. If EC 24 cannot get power load information or determines that information handling system 100 is operating in a reduced capacity mode, EC 24 may cause fan 28 to operate at a fan speed based on the measured temperature.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method for controlling fan speed in an information handling system, the method comprising:
    measuring a temperature associated with the information handling system;
    determining an average power load of the information handling system;
    determining a ratio based on the average power load, a light power load and a heavy power load;
    calculating a single parameter based on the measured temperature and the ratio;
    determining an operating fan speed based on the single parameter; and
    signaling a fan to operate at the operating fan speed.

2. The method of claim 1, wherein the ratio comprises a difference between the average power load and the light power load divided by a difference between the heavy power load minus the light power load.

3. The method of claim 2, wherein calculating the single parameter comprises multiplying the ratio by a first constant.

4. The method of claim 3, wherein determining the single parameter further comprises applying a second constant.

5. The method of claim 3, further comprising:
    determining the information handling system is operating in a reduced capacity mode; and
    setting the first constant to zero, wherein the operating fan speed is determined based on the measured temperature.

6. The method of claim 1, wherein the light power load comprises 60% of the heavy power load.

7. The method of claim 1, wherein measuring the temperature associated with the information handling system comprises measuring a skin temperature of the information handling system.

8. One or more computer-readable non-transitory storage media embodying software that is operable when executed to:
    measure a temperature associated with the information handling system;
    determine an average power load of the information handling system;
    determine a ratio based on the average power load, a light power load and a heavy power load;
    calculate a single parameter based on the measured temperature and the ratio;
    determine an operating fan speed based on the single parameter; and
    signal a fan to operate at the operating fan speed.

9. The media of claim 8, wherein to determine the ratio, the EC executes instructions to determine a difference between the average power load and the light power load divided by a difference between the heavy power load minus the light power load.

10. The media of claim 8, wherein to calculate the single parameter, the EC executes instructions to multiply the ratio by a first constant.

11. The media of claim 10, wherein to calculate the single parameter, the EC executes instruction to apply a second constant.

12. The media of claim 11, wherein the EC executes instructions to:
    determine the information handling system is operating in a reduced capacity mode; and
    set the first constant to zero, wherein the operating fan speed is determined based on the measured temperature.

13. The media of claim 8, wherein the light power load comprises 60% of the heavy power load.

14. The media of claim 8, wherein to measure the temperature associated with the information handling system, the EC executes instruction to communicate with a sensor configured to measure a skin temperature of the information handling system.

15. An information handling system, comprising:
    one or more processors; and
    one or more computer-readable non-transitory storage media comprising instructions operable when executed by an embedded controller (EC) to:
        measure a temperature associated with the information handling system;
        determine an average power load of the information handling system;
        determine a ratio based on the average power load, a light power load and a heavy power load;
        calculate a single parameter based on the measured temperature and the ratio;
        determine an operating fan speed based on the single parameter; and
        signal a fan to operate at the operating fan speed.

16. The information handling system of claim 15, wherein to determine the ratio, the EC executes instructions to determine a difference between the average power load and the light power load divided by a difference between the heavy power load minus the light power load.

17. The information handling system of claim 16, wherein to calculate the single parameter, the EC executes instructions to multiply the ratio by a first constant.

18. The information handling system of claim 16, wherein to calculate the single parameter, the EC executes instruction to apply a second constant.

19. The information handling system of claim 16, wherein the EC executes instructions to:
   determine the information handling system is operating in a reduced capacity mode; and
   set the first constant to zero, wherein the operating fan speed is determined based on the measured temperature.

20. The information handling system of claim 15, comprising a cover, wherein to measure the temperature associated with the information handling system, the EC executes instruction to communicate with a sensor configured to measure a skin temperature of the cover.

\* \* \* \* \*